US008687708B2

(12) United States Patent
Dencher (10) Patent No.: US 8,687,708 B2
(45) Date of Patent: Apr. 1, 2014

(54) METHOD AND APPARATUS FOR RATE DISTORTION OPTIMISATION

(75) Inventor: Anthony Dencher, Southampton (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 334 days.

(21) Appl. No.: 13/140,958

(22) PCT Filed: Dec. 18, 2008

(86) PCT No.: PCT/EP2008/067882
§ 371 (c)(1),
(2), (4) Date: Jun. 20, 2011

(87) PCT Pub. No.: WO2010/069381
PCT Pub. Date: Jun. 24, 2010

(65) Prior Publication Data
US 2011/0255603 A1    Oct. 20, 2011

(51) Int. Cl.
*H04N 7/12* (2006.01)
*H04N 11/02* (2006.01)

(52) U.S. Cl.
USPC ............................... 375/240.27; 375/240.16

(58) Field of Classification Search
None
See application file for complete search history.

(56) References Cited

U.S. PATENT DOCUMENTS

2007/0140337 A1* 6/2007 Lim et al. .................. 375/240.12
2008/0112481 A1* 5/2008 Hsaing et al. ............ 375/240.03

OTHER PUBLICATIONS

Sullivan et al. "Rate-Distortion Optimization for video compression" IEEE Signal processing magazine, Nov. 1998.*

International Search Report for PCT/EP2008/067882, mailed Nov. 3, 2009.
Chen, Y.K. et al., "Implementation of H.264 encoder and decoder on personal computer", Journal of Visual Communication and Image Representation, vol. 17, No. 2, (Apr. 1, 2006), pp. 509-532.
Bojun, M. et al., "Fast intra-prediction mode selection for 4x4 blocks in H.264", Proceedings of International Conference on Acoustics, Speech and Signal Processing, (Apr. 6-10, 2003), vol. 3, pp. III-389-III-392.
Wang, J-C et al., "A fast mode decision Algorithm and its VLSI design for H.264/AVC intra-prediction", IEEE Transactions on Circuits and Systems for Video Technology, vol. 16, No. 10, (Oct. 1, 2007), pp. 1414-1422.
Zhang, K. et al., "An area-efficient VLSI architecture for AVS intra frame encoder", Visual Communications and Image Processing, (Jan. 30, 2007).
JVT/Lim et al., "JM Algorithm description of example encoding methods and decoder loss-concealment methods", Joint Video Team (JVT) of ISO/IEC MPEG & ITU-T VCEG, No. JVT-L046, (Jul. 23, 2004).

(Continued)

*Primary Examiner* — Sath V Perungavoor
*Assistant Examiner* — Kate Luo
(74) *Attorney, Agent, or Firm* — Nixon & Vanderhye, P.C.

(57) ABSTRACT

There is provided a method of optimizing Rate Distortion Optimization candidate assessment in hardware apparatus, comprising determining which Rate Distortion Optimization candidates out of a plurality of candidates are separately processable, determining a processing delay of critical portions of candidate assessment hardware, determining a rule set governing how the separately processable candidates may be ordered for processing, determining an optimized processing order for processing the separately processable candidate assessments, dependent on the processing delay of critical portions of the candidate assessment hardware and the determined rule set, and processing the candidates according to the determined processing order. There is also provided an apparatus for carrying out the improved Rate Distortion Optimization method.

15 Claims, 4 Drawing Sheets

(56) References Cited

OTHER PUBLICATIONS

Spinsante, S. et al., "Fast mode decision strategies for the use of high definition in H.264/AVC based videoconference applications", Picture Coding Symposium, (Apr. 24, 2006).

Iverson, V. et al., "Real-time H.264/AVC codec on intel architectures", Image Processing, vol. 2, (Oct. 24, 2004), pp. 757-760.

Shafique, M. et al., "A parallel approach for high performance hardware design of intra prediction in H.264/AVC Video Codec", Design, Automation & Test, (Apr. 20, 2009, pp. 1434-1439.

International Telecommunication Union, Series H: Audiovisual and Multimedia Systems, Infrastructure of Audiovisual Services—Coding of Moving Video, Advanced Video Coding for Generic Audiovisual Serives, ITU-T H. 264.

H. 264/MPEG-4 Part 10 White Paper, Prediction of Inter Macroblocks in P-slices, www.vcodes.com.

\* cited by examiner

METHOD AND APPARATUS FOR RATE DISTORTION OPTIMISATION

This application is the U.S. national phase of International Application No. PCT/EP2008/067882, filed 18 Dec. 2008, the entire contents of which is hereby incorporated by reference.

TECHNICAL FIELD

The invention is related to digital video encoding in general, and in particular to an improved method of, and apparatus for, Rate Distortion Optimisation.

BACKGROUND

Video compression methods are used within digital television broadcasting systems to reduce the data rate per channel while maintaining picture quality. It is a primary objective of these compression methods that the instantaneous demand of the moving television picture sequence for transmission capacity is substantially met at all times despite its varying complexity.

Typical transmission channels used to convey audio-visual material have fixed bit rates and so the varying demand of the picture sequence for capacity may not always be satisfied. It is an inevitable result of the compression process that for extremes of highly complex picture behaviour, the picture quality may occasionally be compromised in order that the bit rate criteria are met. By choosing a bit rate that is too low, poor quality will result for a significant proportion of the time. Conversely, a chosen bit rate that is too high will meet quality needs, but will waste transmission capacity for a significant proportion of the time. Thus, some kind of control mechanism is required that evens out the peaks and troughs of demand so that a given fixed bit rate is adequate to deliver good picture quality at all times. Part of such control ideally should take some objective measure of the picture quality into account so that the distortion in the picture is known to some degree. The optimisation of this process is called Rate Distortion Optimisation (RDO) and is an inherent part of practical realisations of modern compression methods.

The complex compression methods currently employed have become very sophisticated and use a variety of techniques in concert to achieve the objective of coding complex picture sequences using minimum bit rate. Typically, in such methods the compressed picture sequence of the television signal is hierarchically structured at a number of levels, each enabling the full set of coding tools available to be applied efficiently.

At the highest of these levels, the picture sequence is organised into contiguous Groups of Pictures (GOP) and each group is further organised so that the first picture of each GOP is coded without reference to any other picture in the sequence. This is known as Intra-picture coding, and the resultant picture is called an I picture. Subsequent pictures in the GOP are coded differentially with respect to other pictures in the GOP including this I picture.

For example the second picture in the GOP is typically predicted directly from the first I picture and the differences between the prediction and the actual picture, typically being small, are then coded with the consequence that the bit rate requirement is reduced. The resultant picture is known as a Predicted or P picture.

The next picture of the GOP may also be predicted in turn from this P picture and this pattern may repeat for the remainder of the GOP. These P predictions are uni-directional and use past pictures to predict future ones in a sequence of mutual dependence. It is also possible to code pictures in the GOP using Bi-directional prediction (i.e. using both past and future pictures) which effectively predictively interpolates the current picture. These pictures are known as B pictures. Thus a typical GOP may have a structure such as IPPBPPB or IBBPBBP, etc, and this structure and the GOP length are arbitrary and set by the system operator to suite the needs of a given application.

In typical video systems, a two dimensional image of a scene is usually scanned in a raster fashion from top left to bottom right in a series of so-called horizontal lines, and then each scan is repeated regularly to produce a sequence. The resolution or sharpness of the picture is determined by the number of picture elements or pixels allocated to the scan. The shape of the picture, its aspect ratio, determines the relationship between the number of horizontal and vertical pixels. In broadcast systems these numbers are standardised.

It is typical of television pictures that their representation takes one of two forms. Either the individual picture scans are completed using only one pass of the image or they can be done in two parts where half the scan is done in a first pass, where only the odd numbered horizontal lines are taken, and the second half is done a second pass where the remaining even numbered lines are taken. The former scan type is called Progressive or Sequential scan, and the latter is called an Interlaced scan.

The first pass of the interlaced scan produces the so-called Top Field and the second pass the Bottom Field. The two fields together cover the same number of pixels as the complete Progressive scan, and the complete picture is called a Frame.

It is clear that any movement in the picture during the Interlace scan will result in a degree of dislocation between the pixels of each Field and that degree of dislocation will be more severe the greater the speed of motion. This dislocation can cause a significant loss of efficiency in the compression of moving pictures and so it is better to code rapidly moving picture sequences Field by Field. All currently used compression methods recognise this and allow both Field and Frame modes to be chosen as the picture behaviour demands.

The ITU-T H.264 (MPEG 4 part 10) compression standard used widely in the most recent commercial video compression products includes among its features the use of GOPs and a Field/Frame mode. In particular the coding of both P and B pictures in the GOP uses Inter-Field or Frame predictive methods. In order to extract the best performance from the standard, it divides each complete picture, either a Frame or a Field, into a large number of contiguous, rectilinear blocks of pixels. The most significant of these blocks is a square group of pixels called a macroblock (MB), which is typically 16×16 luminance pixels.

The predictive coding process operates primarily at MB level and the coding of a given MB in a given picture is performed using a prediction from a block or blocks within another picture or pictures in the GOP used as references and which have already been coded. However, the H.264 Inter prediction standard allows not only whole MBs to be predicted from a number of reference pictures, but it also allows various sub-divisions or Partitions of MBs to be predicted. This added sophistication, compared to older compression standards (such as MPEG-2) contributes to the superior performance of H.264. In the particular case of encoding a B Field/Frame, the reference pictures may be from previous pictures in display order—so called reference list0 pictures—or from later pictures in display order—so called reference list1 pictures.

The Predictive process described above, operating at MB or Partition level, seeks to find blocks of pixels in selected reference pictures that match a given block in the picture currently being coded. Motion search methods are commonly used to identify a number of best match blocks, or candidates, from a set of reference pictures. These candidates can be combined in list0/list1 pairs to produce Bi-predicted candidates.

Furthermore 16×16 pixel MBs and 8×8 pixel Partitions may also be predicted using the so called Direct Mode. Hence there may be several Inter prediction candidates for each MB and each Partition which must be compared to find the best, most efficient coding. This flexibility in the number of choices available improves the performance of the method, but at the expense of the additional processing required to evaluate each of the coding options.

Each assessment must be completed within the duration period of the MB, and the computing power and speed needed to do this are challenging and so an efficient practical method of achieving the required result is extremely valuable. For example, in a high definition encoder working on a 1920×1080 pixel picture format at 60 Hz where a typical Frame period is 33.3 milliseconds there are 120×68=8160 MBs, each MB therefore having to be completely coded in 4 microseconds.

To achieve the most efficient and accurate video encoding, the comparison of the candidates ideally takes into account how high the quality of the output image will be, and also how many bits will be taken to encode the candidate. The Rate-Distortion Optimization (RDO) technique solves this problem by taking into account both a video quality metric, measuring the Distortion as the deviation from the source material, and the bit cost for each possible decision outcome.

Currently known methods of RDO candidate assessment are inefficient in their use of available processing resources, necessitating higher powered processing resources than is strictly required. Higher powered processing resources are more expensive to implement, and require attendant increases in running costs, such as cooling requirements and power usage. Accordingly, the present invention seeks to provide an improved method and apparatus for assessing RDO candidates.

SUMMARY

Embodiments of the present invention also provide a method of optimising Rate Distortion Optimisation candidate assessment in hardware apparatus, comprising determining which Rate Distortion Optimisation candidates out of a plurality of candidates are separately processable, determining a processing delay of critical portions of candidate assessment hardware, determining a rule set governing how the separately processable candidates may be ordered for processing, determining an optimised processing order for processing the separately processable candidate assessments, dependent on the processing delay of critical portions of the candidate assessment hardware and the determined rule set, and processing the candidates according to the determined processing order.

The critical portions of candidate processing hardware are the Rate Distortion Optimisation Best Candidate Decision Block, the Motion Vector Predictor Calculation Block, and the Sum and Langrangian Multiplication Block.

Optionally, the rule set is dependent on the number of candidates being processed during Rate Distortion Optimisation.

Optionally, where the input video resolution is 1080i, and the separately processable candidate assessments comprise:
A. 16×8 partition 0×candidates 0-7;
B. 16×8 partition 1×candidates 0-7;
C. 8×16 partition 0×candidates 0-7;
D. 8×16 partition 1×candidates 0-7;
E. 8×8 partition 0×candidates 0-8;
F. 8×8 partition 1×candidates 0-8;
G. 8×8 partition 2×candidates 0-8;
H. 8×8 partition 3×candidates 0-8;
I. 16×16 MB×candidates 0-2;
J. 16×16 MB×candidates 3-4;
K. 16×16 MB×candidates 5-6;
L. 16×16 MB×candidates 7-8;
M. Best 16×8 partitions as complete MB, Best 8×16 partitions as complete MB, Best 8×8 partitions as complete MB, then the rule set for ordering the separately processable candidates may be:
B>A+1;
D>C+1;
F>E+1;
G>F+1;
H>G+1;
J>I;
K>J;
L>K; and
M is last.

Optionally, where the input video resolution is 1080p, and the separately processable candidate assessments comprise:
A. 16×8 partition 0×candidates 0-2;
B. 16×8 partition 1×candidates 0-2;
C. 8×16 partition 0×candidates 0-2;
D. 8×16 partition 1×candidates 0-2;
E. 8×8 partition 0×candidates 0-3;
F. 8×8 partition 1×candidates 0-3;
G. 8×8 partition 2×candidates 0-3;
H. 8×8 partition 3×candidates 0-3;
I. 16×16 MB×candidates 0-1;
J. 16×16 MB×candidates 2-3;
K. Best 16×8 partitions as complete MB, Best 8×16 partitions as complete MB, Best 8×8 partitions as complete MB, then the rule set for ordering the separately processable candidates may be:
B>A+1;
D>C+1;
F>E+1;
G>F+1;
H>G+1;
J>I;
K is last.

Optionally, where the input video resolution is SDTV, and the separately processable candidate assessments comprise:
A. 16×8 partition 0×candidates 0-7;
B. 8×16 partition 0×candidates 0-7;
C. 16×8 partition 1×candidates 0-7;
D. 8×16 partition 1×candidates 0-7;
E. 16×16 MB×candidates 0-2;
F. 8×8 partition 0×candidates 0-32;
G. 16×16 MB×candidates 3-4;
H. 8×8 partition 1×candidates 0-32;
I. 16×16 MB×candidates 5-6;
J. 8×8 partition 2×candidates 0-32;
K. 16×16 MB×candidates 7-8;
L. 8×8 partition 3×candidates 0-32;
M. Best 16×8 partitions as complete MB, Best 8×16 partitions as complete MB, Best 8×8 partitions as complete MB, then the rule set for ordering the separately processable candidates may be:

B>A+1;
D>C+1;
F>E+1;
G>F+1;
H>G+1;
J>I;
K>J;
L>K;
M is last.

Optionally, the plurality of the separately processable candidate assessments comprises a single logical set of candidate assessments, and the method further comprises temporarily storing intermediate results from a one of the plurality of separately processable candidate assessments in the single logical set of candidate assessments for use by another one of the plurality of separately processable candidate assessments in the single logical set of candidate assessments, in logical order.

Embodiments of the present invention also provide an apparatus for Rate Distortion Optimisation processing adapted to carry out any of the above method.

Optionally, the apparatus is a video encoder.

Optionally, the apparatus is pipelined.

BRIEF DESCRIPTION OF THE DRAWINGS

A method of optimising Rate Distortion Optimisation candidate assessment in hardware will now be described, by way of example only, with reference to the accompanying drawings in which.

DETAILED DESCRIPTION

An embodiment of the invention will now be described with reference to the accompanying drawings in which the same or similar parts or steps have been given the same or similar reference numerals.

The RDO process operates according to the equation:

$$RDO\ Result = \lambda R + D \quad (1)$$

where $\lambda$ is the Lagrangian multiplier which can be set empirically, depending upon the quality target, R is a measure of the bit cost and D is a measure of the Distortion caused in the picture as a result of the compression coding choice.

The optimisation compares a number of candidate coding choices and selects the best RDO result which contributes to an improvement in coding quality.

The bit cost R is comprised of three main components representing the contributions to the total bit cost:
(a) the Motion Vector Differences (MVD) contribution $R_{MV}$;
(b) the coded transform coefficients or residuals contribution, $R_R$; and
(c) the contribution from the other syntax elements of the macroblock layer syntax $R_O$.

It is the MVD contribution $R_{MV}$ that is the focus of the present invention, as described in more detail below.

It is desirable to address the way in which RDO is performed, by assuring most efficient use of given hardware processing resources, so that the available options can be assessed optimally and the best potential of the compression method achieved in its practical hardware realisations.

The distortion can be measured using a difference metric between the source and reference blocks, for example, Sum of Absolute Differences in the pixel domain (SAD), Sum of Squared Differences in the pixel domain (SSD) or Sum of Absolute Transform Differences in the transform domain (SATD).

The $R_{MV}$ value is calculated using the absolute difference between the candidate motion vector and the Motion Vector Predictor (MVP) which is calculated from the neighbouring motion vectors (MVs) as defined in the compression method in use, for example H.264.

As the MVP is calculated from the MVs of the neighbouring MBs or partitions, it cannot be calculated until the best candidates for the neighbouring MBs or partitions have been chosen.

For a high performance broadcast video encoder, a hardware design (FPGA or ASIC) can be used as an efficient realisation of the RDO method described for all Inter prediction candidates. A pipelined design such as that shown in FIG. 1 can process the required amount of data within the MB period (4 μs), but can only do this optimally provided that the candidates are processed contiguously such that the pipeline is kept full.

Figure 1:
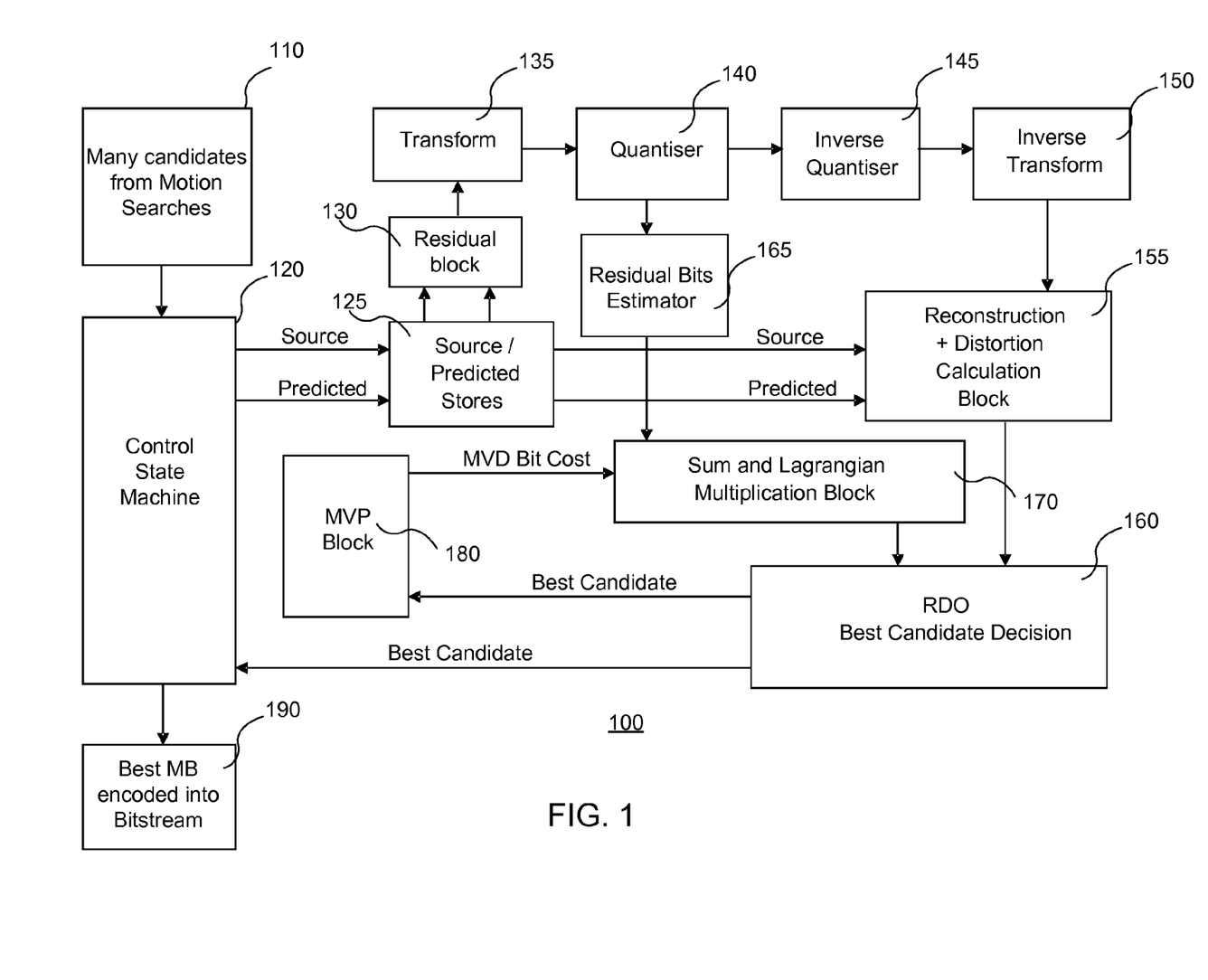
FIG. 1 shows a block schematic diagram of an Inter Candidate Rate Distortion Optimisation (RDO) hardware engine according to an embodiment of the present invention.

FIG. 1 shows a design for processing inter predicted candidates according to an embodiment of the present invention. A number of candidates are received from the motion search and refinement search stages 110, along with the source MB. The control state machine 120 controls the RDO processing and presents the residual block 130 and the reconstruction and distortion calculation block 155 with the source and the predicted pixels as required.

The residual block 130 subtracts the predicted pixels from the source pixels to produce the residual values. The residual values are transformed 135 and quantised 140, then inverse quantised 145 and inverse transformed 150. The inverse transform 150 output is used along with source and predicted pixels from the source/predicted stores 125 for reconstruction and distortion calculation 155.

Meanwhile, the transformed and quantised residuals are fed to the residual bits estimator 165, which provides the $R_R$ rate contribution value described above. The $R_R$ rate contribution value is added to the MVD Bit Cost $R_{MV}$ from the MVP block 180 and other rate contribution $R_O$, then multiplied by $\lambda$ within the Sum and Langrangian Multiplication block 170. The result is the rate term, which is fed along with the distortion term from the Reconstruction and Distortion calculation block 155 into the RDO Best Candidate Decision block 160.

The Best Candidate Decision block 160 keeps track of the candidate with the lowest RDO score, which is the best candidate and is outputted to the MVP block 180 and the control state machine 120.

A high performance 1080i H.264 encoder may use, for example, 2 list0 reference fields and 2 list1 reference fields and 16×8, 8×16 and 8×8 partitions. If the motion searches produce 1 candidate per reference field, then for a B field all the partition sizes have the following 8 potential candidates per partition:
   2 list 0 candidates
   2 list 1 candidates
   4 bi-predicted candidates
16×16 MBs and 8×8 partitions also have a ninth candidate per partition:
   1 direct mode candidate The current method to process all the RDO candidates is to process all the partition candidates of a particular partition size sequentially before starting on the next partition size. This arrangement of processing the candidates is shown in FIG. 2.

So the control state machine is normally designed to process the blocks in the following order:
1. 8×8 partitions
   a. partition 0, 9 candidates
   b. partition 1, 9 candidates
   c. partition 2, 9 candidates
   d. partition 3, 9 candidates
2. 8×16 partitions
   a. partition 0, 8 candidates
   b. partition 1, 8 candidates
3. 16×8 partitions
   a. partition 0, 8 candidates
   b. partition 1, 8 candidates
4. 16×16 MB
   a. 9 candidates
   b. MB of best 8×8 partitions
   c. MB of best 16×8 partitions
   d. MB of best 8×16 partitions However, this leads to a problem with processing the candidates contiguously. For example, since the 16×8 partition 1 MVD bit cost $R_{MV}$ 250 cannot start to be calculated until the best 16×8 partition0 candidate has been chosen 240, there has to be a gap between them 260 equal to the latency of the RDO Best Candidate Decision block 160, the MVP block 180 and the Sum and Lagrangian Multiplication block 170.

The same applies between 8×16 partitions 0 and 1, and between all the 8×8 partitions, e.g. Part0 210 and Part1 230.

Figure 2:
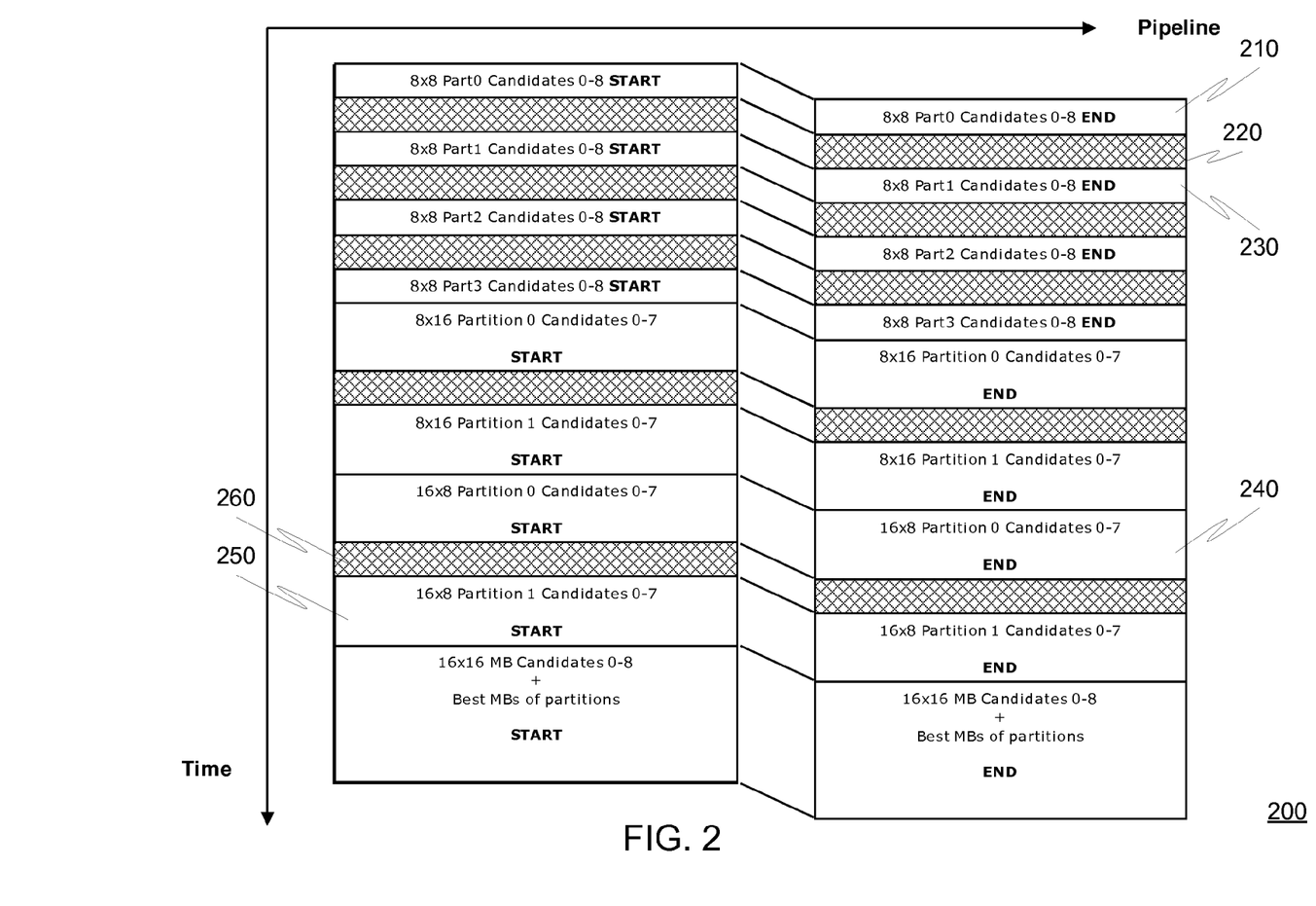
FIG. 2 shows a prior art method of assessing RDO candidates.

These gaps are shown as cross-hatching in FIG. 2 (item 220) and they significantly reduce the efficiency of the pipelined design, such that for a given clock speed and design size fewer candidates can be processed within a MB period.

The prior art solutions to this problem are:
To estimate the MVD bit cost without using any neighbouring blocks. This however reduces the accuracy of the MVD bit cost and ultimately the performance of the encoder.
To process fewer candidates in the same time—i.e. fewer partition sizes or fewer reference fields/frames could be used, however this reduces the performance of the encoder.
To increase the size of the integrated circuit design so it can process some candidates in parallel, but this would require more hardware increasing the cost of the encoder.
To increase the clock speed of the processing resources, in order to process the same number of candidates within a MB period. Even when possible, a clock speed increase in FPGA or ASIC technology is more expensive.

Whilst the above approaches work, they do not provide any form of optimised candidate processing. Thus embodiments of the present invention seek to provide an improved efficiency method and apparatus for Rate Distortion Optimisation.

The present invention is most typically embodied as a pipelined Hardware Description Language (HDL) design for FPGA or ASIC implementation, which contiguously processes Inter prediction candidates using rate-distortion optimization.

Figure 3:
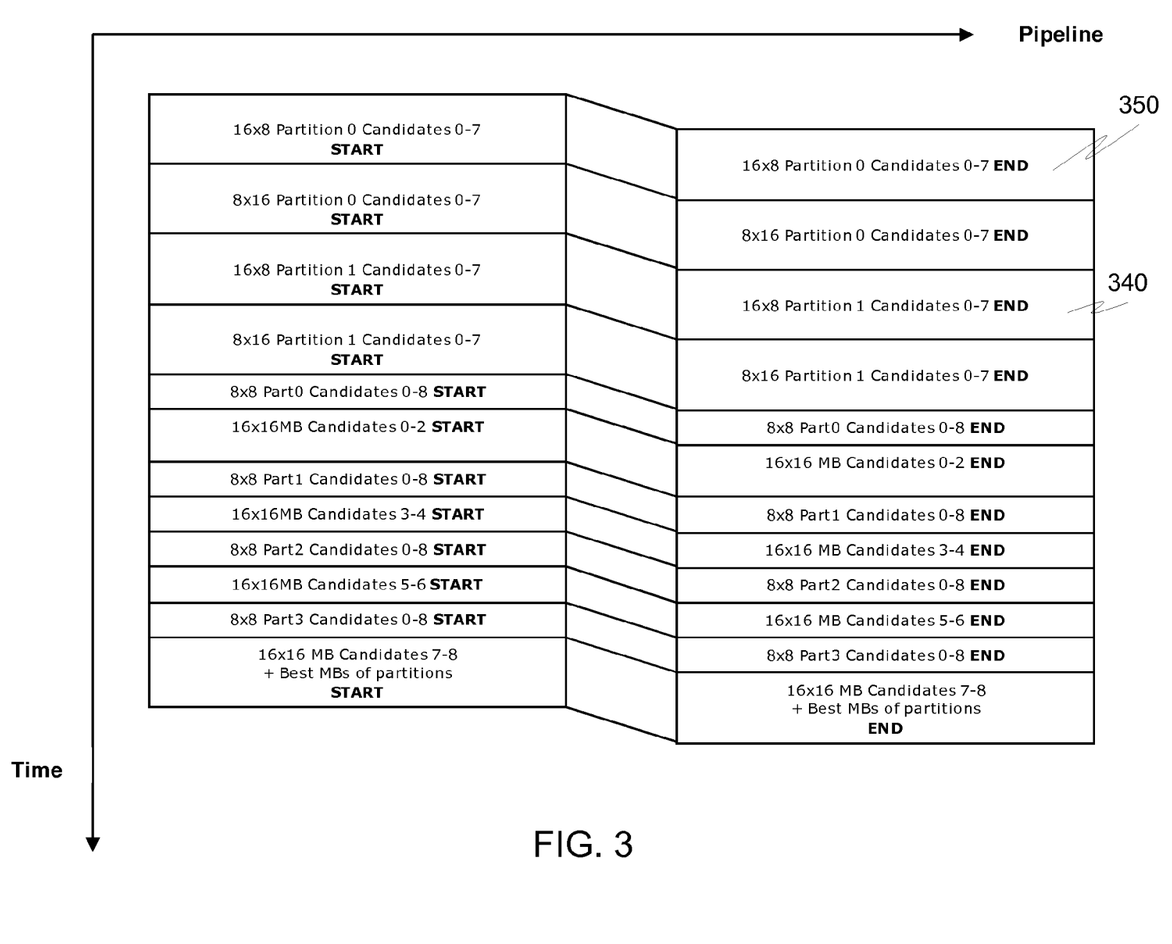
FIG. 3 shows a method of assessing RDO candidates according to an embodiment of the present invention.

The key point is that the candidate assessment processing is performed in an order whereby the pipelined hardware design can be kept full as illustrated by FIG. 3. This avoids wasting processing clock cycles, thus providing a more efficient design than existing implementations, i.e. the candidate processing is separated out into portions that are separately processable, and then a rule set that determines a workable order of processing is derived.

Due to the constraint that the neighbouring blocks must have been chosen when calculating the MVP for a partition as described above, and taking into account the latency of the computational resources/blocks involved in calculating the $R_{MV}$ MVD bit cost, candidates must be processed in an order such that a partition is never processed directly after a neighbouring partition of the same size to avoid wasted clock cycles. This constraint provides the rule set required.

In a design according to an embodiment of the present invention, enough clock cycles are spent usefully processing other candidates in between partitions of the same size, such that the best candidate can always be set for a partition in time to calculate the MVD bit cost $R_{MV}$ for the next partition.

Hence, as can be seen from FIG. 3 when compared to FIG. 2, there are no delays (hatched gaps), and in the case of the specific example mentioned previously, processing of 16×8 partition0 MVD bit cost 350 is carried out in advance of processing of the best 16×8 partition1 candidate 340, so the result is ready and available in time for step 340 (as required by the rule set). The fact that the processing of the 8×16 Partition 0 candidate has occurred between the two has meant the processing resources have been kept busy when in the prior art they would have been waiting for the result of 350.

This design can be used for performing RDO on nine 16×16 candidates, eight 16×8 partition candidates, eight 8×16 partition candidates and nine 8×8 partition candidates. This is based on a 1080i H.264 encoder with 2 list0 reference fields and 2 list1 reference fields, as described above.

An encoder with the same processing resources but encoding Progressive HDTV (i.e. 1080p) or Standard Definition TV (SDTV) would have different numbers of candidates.

For example, a 1080p H.264 encoder with 1 list0 reference field and 1 list1 reference field could use four 16×16 candidates, three 16×8 partition candidates, three 8×16 partition candidates and four 8×8 partition candidates. Such a situation is described in more detail below.

Meanwhile, an SD H.264 encoder with 2 list0 reference fields and 2 list1 reference fields may use more partitions sizes, for example 8×4, 4×8 and 4×4 partitions. Such a situation is also described in more detail below.

1080i Example

The latency of the RDO Best Candidate Decision block, the MVP block and the Sum and Lagrangian Multiplication block is typically shorter than the processing time of four 16×8 partition candidates, four 8×16 partition candidates or two 16×16 MB candidates.

Therefore the control state machine has been designed to process the candidates contiguously by interleaving the 16×8 and 8×16 partitions, and processing two 16×16 candidates between each 8×8 partition. To minimise complexity the processing of all the candidates for a partition are continuous where possible.

If the separable processes for the 1080i case are given the following labels A to M:
A. 16×8 partition 0×candidates 0-7
B. 16×8 partition 1×candidates 0-7
C. 8×16 partition 0×candidates 0-7
D. 8×16 partition 1×candidates 0-7
E. 8×8 partition 0×candidates 0-8
F. 8×8 partition 1×candidates 0-8
G. 8×8 partition 2×candidates 0-8
H. 8×8 partition 3×candidates 0-8
I. 16×16 MB×candidates 0-2
J. 16×16 MB×candidates 3-4
K. 16×16 MB×candidates 5-6
L. 16×16 MB×candidates 7-8
M. Best 16×8 partitions as complete MB, Best 8×16 partitions as complete MB, Best 8×8 partitions as complete MB.

The best 16×16 RDO value so far must be kept between stages I, J, K, L and M.

Then the processing order rules are:
1. B>A+1, i.e. B must not be processed immediately after A
2. D>C+1
3. F>E+1
4. G>F+1
5. H>G+1
6. J>I, i.e. J must be processed after I
7. K>J
8. L>K
9. M is last This leads to a large but finite number of solutions. For example, just moving B around within the constraints of rule 1 provides the following set of processing solutions:
A, C, B, D, E, I, F, J, G, K, H, L, M
A, C, D, B, E, I, F, J, G, K, H, L, M
A, C, D, E, B, I, F, J, G, K, H, L, M
A, C, D, E, I, B, F, J, G, K, H, L, M
A, C, D, E, I, F, B, J, G, K, H, L, M
A, C, D, E, I, F, J, B, G, K, H, L, M
A, C, D, E, I, F, J, G, B, K, H, L, M
A, C, D, E, I, F, J, G, K, B, H, L, M
A, C, D, E, I, F, J, G, K, H, B, L, M
A, C, D, E, I, F, J, G, K, H, L, B, M A suitable final processing order solution which abides by the above rules is the following:
1. 16×8 partition 0×candidates 0-7
2. 8×16 partition 0×candidates 0-7
3. 16×8 partition 1×candidates 0-7
4. 8×16 partition 1×candidates 0-7
5. 16×16 MB×candidates 0-2
6. 8×8 partition 0×candidates 0-8
7. 16×16 MB×candidates 3-4
8. 8×8 partition 1×candidates 0-8
9. 16×16 MB×candidates 5-6
10. 8×8 partition 2×candidates 0-8
11. 16×16 MB×candidates 7-8
12. 8×8 partition 3×candidates 0-8
13. Best 16×8 partitions as complete MB, Best 8×16 partitions as complete MB, Best 8×8 partitions as complete MB.

The best 16×16 RDO value so far must be kept between stages 5, 7, 9, 11 and 13. This requires a relatively small amount of extra logic (to carry out a "pop" and "push" operation on the temporary result) in comparison to the gain in efficiency of the overall design.

This order of processing is not the only possible solution for contiguous processing for example the 8×8 partitions could be interleaved within the 16×8 and 8×16 partitions.

1080p Example

The design concept could also be used for fewer candidates, for example four 16×16 candidates, three 16×8 partition candidates, three 8×16 partition candidates and four 8×8 partition candidates. This could be the configuration for a 1080p encoder using the same processing resources as mentioned above.

If the separable processes for the 1080p case are given the following labels A to K:
A. 16×8 partition 0×candidates 0-2
B. 16×8 partition 1×candidates 0-2
C. 8×16 partition 0×candidates 0-2
D. 8×16 partition 1×candidates 0-2
E. 8×8 partition 0×candidates 0-3
F. 8×8 partition 1×candidates 0-3
G. 8×8 partition 2×candidates 0-3
H. 8×8 partition 3×candidates 0-3
I. 16×16 MB×candidates 0-1
J. 16×16 MB×candidates 2-3
K. Best 16×8 partitions as complete MB, Best 8×16 partitions as complete MB, Best 8×8 partitions as complete MB.

The best 16×16 RDO value so far must be kept between stages I, J, and M.

Then the processing order rules are:
1. B>A+1, i.e. B must not be processed immediately after
2. D>C+1
3. F>E+1
4. G>F+1
5. H>G+1
6. J>I, i.e. J must be processed after I
7. K is last Again, this does lead to a large but finite number of solutions. For example, just moving B around within the constraints of rule 1 provides the following set of processing solutions:
A, C, B, E, D, F, I, G, J, H, K
A, C, E, B, D, F, I, G, J, H, K
A, C, E, D, B, F, I, G, J, H, K
A, C, E, D, F, B, I, G, J, H, K
A, C, E, D, F, I, B, G, J, H, K
A, C, E, D, F, I, G, B, J, H, K
A, C, E, D, F, I, G, J, B, H, K
A, C, E, D, F, I, G, J, H, B, K For a 1080p H.264 encoder with 1 list0 reference field and 1 list1 reference field a suitable final processing order solution which abides by the above rules is the following:
1. 16×8 partition 0×candidates 0-2
2. 8×8 partition 0×candidates 0-3
3. 8×16 partition 0×candidates 0-2
4. 16×8 partition 1×candidates 0-2
5. 8×16 partition 1×candidates 0-2
6. 8×8 partition 1×candidates 0-3
7. 16×16 MB×candidates 0-1
8. 8×8 partition 2×candidates 0-3
9. 16×16 MB×candidates 2-3
10. 8×8 partition 3×candidates 0-3
11. Best 16×8 partitions as complete MB, Best 8×16 partitions as complete MB, Best 8×8 partitions as complete MB.

The best 16×16 RDO value so far must be kept between stages 7, 9, and 11. This requires a relatively small amount of extra logic (to carry out a "pop" and "push" operation on the temporary result) in comparison to the gain in efficiency of the overall design.

Standard Definition TV Example

The design concept could also be used with more partitions sizes, for example 8×4, 4×8 and 4×4 partitions could be used.

This could be the configuration for a Standard Definition encoder using the same processing resources as mentioned above.

If the separable processes for the 1080p case are given the following labels A to M:
A. 16×8 partition 0×candidates 0-7
B. 8×16 partition 0×candidates 0-7
C. 16×8 partition 1×candidates 0-7
D. 8×16 partition 1×candidates 0-7
E. 16×16 MB×candidates 0-2
F. 8×8 partition 0×candidates 0-32
G. 16×16 MB×candidates 3-4
H. 8×8 partition 1×candidates 0-32
I. 16×16 MB×candidates 5-6
J. 8×8 partition 2×candidates 0-32
K. 16×16 MB×candidates 7-8
L. 8×8 partition 3×candidates 0-32
M. Best 16×8 partitions as complete MB, Best 8×16 partitions as complete MB, Best 8×8 partitions as complete MB.

The best 16×16 RDO value so far must be kept between stages E, G, I, K, and M.

Then the processing order rules are:
1. B>A+1, i.e. B must not be processed immediately after A
2. D>C+1
3. F>E+1
4. G>F+1
5. H>G+1
6. J>I, i.e. J must be processed after I
7. K>J
8. L>K
9. M is last Again, this does lead to a large but finite number of solutions. For example, just moving B around within the constraints of rule 1 provides the following set of processing solutions:
A, C, B, D, E, I, F, J, G, K, H, L, M
A, C, D, B, E, I, F, J, G, K, H, L, M
A, C, D, E, B, I, F, J, G, K, H, L, M
A, C, D, E, I, B, F, J, G, K, H, L, M
A, C, D, E, I, F, B, J, G, K, H, L, M
A, C, D, E, I, F, J, B, G, K, H, L, M
A, C, D, E, I, F, J, G, B, K, H, L, M
A, C, D, E, I, F, J, G, K, B, H, L, M
A, C, D, E, I, F, J, G, K, H, B, L, M
A, C, D, E, I, F, J, G, K, H, L, B, M Thus, for an SDTV H.264 encoder with 2 list0 reference fields and 2 list1 reference fields, a suitable processing order might be:
1. 16×8 partition 0×candidates 0-7
2. 8×16 partition 0×candidates 0-7
3. 16×8 partition 1×candidates 0-7
4. 8×16 partition 1×candidates 0-7
5. 16×16 MB×candidates 0-2
6. 8×8 partition 0×candidates 0-32
7. 16×16 MB×candidates 3-4
8. 8×8 partition 1×candidates 0-32
9. 16×16 MB×candidates 5-6
10. 8×8 partition 2×candidates 0-32
11. 16×16 MB×candidates 7-8
12. 8×8 partition 3×candidates 0-32
13. Best 16×8 partitions as complete MB, Best 8×16 partitions as complete MB, Best 8×8 partitions as complete MB.

The best 16×16 RDO value so far must be kept between stages 5, 7, 9, 11, and 13. This requires a relatively small amount of extra logic (to carry out a "pop" and "push" operation on the temporary result) in comparison to the gain in efficiency of the overall design.

It should be noted that due to the constraint within the H.264 standard that sub MB partitions cannot use different reference frame/fields, 4×8, 8×4 and 4×4 partitions can not be assessed individually, but must all be considered as 8×8 partitions. This effectively means there are 8 candidates (two Predicted List0, two Predicted List1 and 4 Bi-predicted) per 8×8 partition for each sub MB partition size plus the direct 8×8, giving 33 candidates in total. The herein described processing order method can be extended to this situation.

Figure 4:
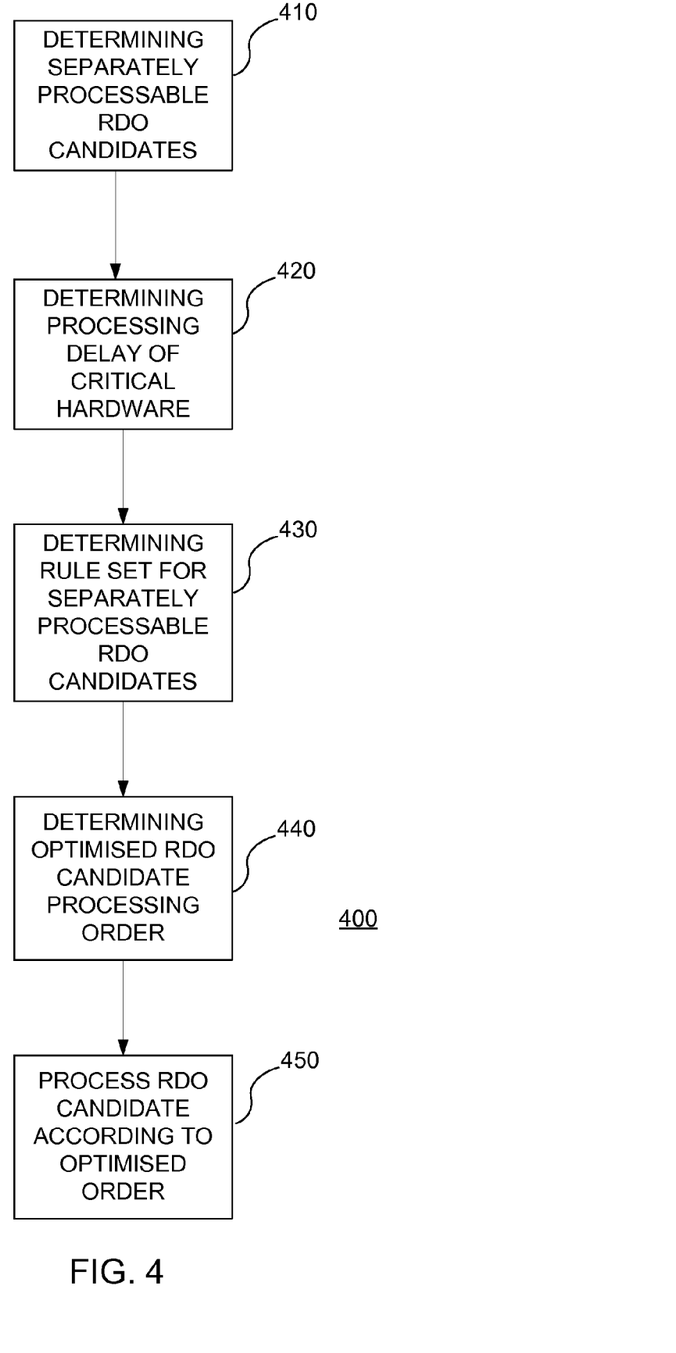
FIG. 4 shows a flow diagram of the method for optimising RDO candidate assessment according to an embodiment of the present invention.

FIG. 4 shows a flow diagram of the method 400 for optimising RDO candidate assessment according to an embodiment of the present invention. In particular, the method 400 starts at step 410 by determining which Rate Distortion Optimisation candidate assessments out of the many needing assessing can be processed separately, then the method moves to step 420, where the processing delays introduced by the critical portions of the candidate assessment hardware (i.e. the Rate Distortion Optimisation Best Candidate Decision Block 155, Motion Vector Predictor Calculation Block 180, and a Sum and Langrangian Multiplication Block 170) are determined.

At step 430, a rule set governing how the separately processable candidate assessments may be ordered is determined, and at step 440, an optimised RDO candidate assessment processing order is determined, dependent upon the processing delay and rule set derived previously. At step 450, the RDO candidates are assessed according to the optimised processing order.

It will be appreciated that the many candidates to be assessed comprise sets of logically grouped candidates (e.g. 16×16×candidates 0-8), where the final candidate result is dependent on an iterative progression through the entire logical set (i.e. there are intermediate results that must be used in the following calculations). Therefore, since the optimisation method may break these logical sets up into smaller units (e.g. 16×16×candidates 0-2; 16×16×candidates 3-4; etc), intermediate results may need to be stored temporarily whilst another candidate grouping is assessed. This is where a "pop" and "push" function may be required, as described above.

The above described method and apparatus allows a pipelined RDO design such as that shown in FIG. 1 to be used to maximum efficiency by keeping the pipeline full.

Accordingly, the resultant RDO candidate assessment method and apparatus is much more efficient in its use of the available processing resources, hence more candidates can be processed within the MB period for a given design size and clock speed. Generally RDO comparison of more candidates per unit time will give better video encoding performance.

As mentioned previously, the method may be embodied as a specially programmed, or hardware designed, integrated circuit which operates to carry out the method on RDO candidate data loaded into the said integrated circuit. The integrated circuit may be formed as part of a general purpose computing device, such as a PC, and the like, or it may be formed as part of a more specialised device, such as a games console, mobile phone, portable computer device or hardware video encoder.

One exemplary hardware embodiment is that of a Field Programmable Gate Array (FPGA) programmed to carry out the described method, located on a daughterboard of a rack mounted video encoder, for use in, for example, a television studio or location video uplink van supporting an in-the-field news team.

Another exemplary hardware embodiment of the present invention is that of a video encoder comprising an Application Specific Integrated Circuit (ASIC).

For some applications of RDO, implementation issues such as cost and latency dominate and need to be given priority but without loss of picture quality. The above described embodiments of the present invention address this area directly and provides far more competitive performance with little further hardware resources being required compared to the prior art.

It will be apparent to the skilled person that the exact order and content of the processing order in the method described herein may be altered according to the requirements of a particular set of execution parameters, such as speed of encoding, accuracy, and the like. Accordingly, the claim numbering is not to be construed as a strict limitation on the ability to move steps between claims, and as such portions of dependent claims maybe utilised freely.

The invention claimed is:

1. A method of optimising Rate Distortion Optimisation candidate assessment in hardware apparatus, comprising:
   determining which Rate Distortion Optimisation candidates out of a plurality of candidates are separately processable, wherein the candidates are partitions of a picture;
   determining a processing delay of critical portions of candidate assessment hardware, wherein the critical portions of candidate processing hardware include a Rate Distortion Optimization Best Candidate Decision Block; a Motion Vector Predictor Calculation Block; and a Sum and Langrangian Multiplication Block;
   determining a rule set governing how the separately processable candidates may be ordered for processing, wherein the rule set for ordering the separately processable candidates depends on the input video resolution;
   determining an optimised processing order for processing the separately processable candidate assessments, dependent on the processing delay of critical portions of the candidate assessment hardware and the determined rule set;
   spending enough clock cycles processing other candidates in between partitions of the same size, such that the best candidate for a given partition can be set in time to calculate a motion vector difference (MVD) bit cost (RMV) for the next partition; and
   processing the candidates according to the determined processing order.

2. The method of claim 1, wherein the rule set is dependent on the number of candidates being processed during Rate Distortion Optimisation.

3. The method of claim 1, wherein an input video resolution is 1080i, and wherein the separately processable candidate assessments comprise:
   A. 16×8 partition 0×candidates 0-7;
   B. 16×8 partition 1×candidates 0-7;
   C. 8×16 partition 0×candidates 0-7; D. 8×16 partition 1×candidates 0-7;
   E. 8×8 partition 0×candidates 0-8;
   F. 8×8 partition 1×candidates 0-8;
   G. 8×8 partition 2×candidates 0-8; H. 8×8 partition 3×candidates 0-8;
   I. 16×16 MB×candidates 0-2;
   J. 16×16 MB×candidates 3-4;
   K. 16×16 MB×candidates 5-6;
   L. 16×16 MB×candidates 7-8;
   M. Best 16×8 partitions as complete MB, Best 8×16 partitions as complete MB, Best 8×8 partitions as complete MB; and wherein the rule set for ordering the separately processable candidates comprises:
   B>A+1; D>C+1;
   F>E+1;
   G>F+1;
   H>G+1;
   J>1; K>J;
   L>K; and
   M is last.

4. The method of claim 1, wherein an input video resolution is 1080p, and wherein the separately processable candidate assessments comprise:
   A. 16×8 partition 0×candidates 0-2;
   B. 16×8 partition 1×candidates 0-2;
   C. 8×16 partition 0×candidates 0-2;
   D. 8×16 partition 1×candidates 0-2; E. 8×8 partition 0×candidates 0-3;
   F. 8×8 partition 1×candidates 0-3;
   G. 8×8 partition 2×candidates 0-3; H. 8×8 partition 3×candidates 0-3; I. 16×16 MB×candidates 0-1; J. 16×16 MB×candidates 2-3;
   K. Best 16×8 partitions as complete MB, Best 8×16 partitions as complete MB, Best 8×8 partitions as complete MB;
   and wherein the rule set for ordering the separately processable candidates comprises:
   B>A+1;
   D>C+1;
   F>E+1;
   G>F+1;
   H>G+1;
   J>1; K is last.

5. The method of claim 1, wherein an input video resolution is SDTV, and wherein the separately processable candidate assessments comprise:
   A. 16×8 partition 0×candidates 0-7;
   B. 8×16 partition 0×candidates 0-7;
   C. 16×8 partition 1×candidates 0-7;
   D. 8×16 partition 1×candidates 0-7; E. 16×16 MB×candidates 0-2;
   F. 8×8 partition 0×candidates 0-32;
   G. 16×16 MB×candidates 3-4;
   H. 8×8 partition 1×candidates 0-32;
   I. 16×16 MB×candidates 5-6; J. 8×8 partition 2×candidates 0-32;
   K. 16×16 MB×candidates 7-8;
   L. 8×8 partition 3×candidates 0-32;
   M. Best 16×8 partitions as complete MB, Best 8×16 partitions as complete MB, Best 8×8 partitions as complete MB;
   and wherein the rule set for ordering the separately processable candidates comprises:
   B>A+1;
   D>C+1;
   F>E+1; G>F+1;
   H>G+1;
   J>1;
   K>J;
   L>K;
   M is last.

6. The method of claim 1 wherein a plurality of the separately processable candidate assessments comprises a single logical set of candidate assessments, and the method further comprises temporarily storing intermediate results from a one of the plurality of separately processable candidate assessments in the single logical set of candidate assessments for use by another one of the plurality of separately processable candidate assessments in the single logical set of candidate assessments, in logical order.

7. Apparatus for Rate Distortion Optimisation processing adapted to carry out the method of claim 1.

8. The apparatus of claim 7, wherein the apparatus is a video encoder.

9. The method of claim 1, wherein the apparatus is pipelined.

10. The method of claim 1, wherein the rule set requires that candidates be processed in an order such that a partition is never processed directly after a neighbouring partition of the same size.

11. A video decoder comprising a control state machine configured to:
   determine which Rate Distortion Optimisation candidates out of a plurality of candidates are separately processable, wherein the candidates are partitions of a picture;
   determine a processing delay of critical portions of candidate assessment hardware, wherein the critical portions of candidate processing hardware include a Rate Distortion Optimization Best Candidate Decision Block; a Motion Vector Predictor Calculation Block; and a Sum and Langrangian Multiplication Block;
   determine a rule set governing how the separately processable candidates may be ordered for processing, wherein the rule set for ordering the separately processable candidates depends on the input video resolution;
   determine an optimised processing order for processing the separately processable candidate assessments, dependent on the processing delay of critical portions of the candidate assessment hardware and the determined rule set;
   spend enough clock cycles processing other candidates in between partitions of the same size, such that the best candidate for a given partition can be set in time to calculate a motion vector difference (MVD) bit cost (RMV) for the next partition; and
   process the candidates according to the determined processing order.

12. The video coder of claim 11, wherein the rule set requires that candidates be processed in an order such that a partition is never processed directly after a neighbouring partition of the same size.

13. The method of claim 11, wherein an input video resolution is 1080i, and wherein the separately processable candidate assessments comprise:
   A. 16×8 partition 0×candidates 0-7;
   B. 16×8 partition 1×candidates 0-7;
   C. 8×16 partition 0×candidates 0-7; D. 8×16 partition 1×candidates 0-7;
   E. 8×8 partition 0×candidates 0-8;
   F. 8×8 partition 1×candidates 0-8;
   G. 8×8 partition 2×candidates 0-8; H. 8×8 partition 3×candidates 0-8;
   I. 16×16 MB×candidates 0-2;
   J. 16×16 MB×candidates 3-4;
   K. 16×16 MB×candidates 5-6;
   L. 16×16 MB×candidates 7-8;
   M. Best 16×8 partitions as complete MB, Best 8×16 partitions as complete MB, Best 8×8 partitions as complete MB; and wherein the rule set for ordering the separately processable candidates comprises:
   B>A+1; D>C+1;
   F>E+1;
   G>F+1;
   H>G+1;
   J>1; K>J;
   L>K; and
   M is last.

14. The method of claim 11, wherein an input video resolution is 1080p, and wherein the separately processable candidate assessments comprise:
   A. 16×8 partition 0×candidates 0-2;
   B. 16×8 partition 1×candidates 0-2;
   C. 8×16 partition 0×candidates 0-2;
   D. 8×16 partition 1×candidates 0-2; E. 8×8 partition 0×candidates 0-3;
   F. 8×8 partition 1×candidates 0-3;
   G. 8×8 partition 2×candidates 0-3; H. 8×8 partition 3×candidates 0-3; I. 16×16 MB×candidates 0-1; J. 16×16 MB×candidates 2-3;
   K. Best 16×8 partitions as complete MB, Best 8×16 partitions as complete MB, Best 8×8 partitions as complete MB;
   and wherein the rule set for ordering the separately processable candidates comprises:
   B>A+1;
   D>C+1;
   F>E+1;
   G>F+1;
   H>G+1;
   J>1; K is last.

15. The method of claim 11, wherein an input video resolution is SDTV, and wherein the separately processable candidate assessments comprise:
   A. 16×8 partition 0×candidates 0-7;
   B. 8×16 partition 0×candidates 0-7;
   C. 16×8 partition 1×candidates 0-7;
   D. 8×16 partition 1×candidates 0-7; E. 16×16 MB×candidates 0-2;
   F. 8×8 partition 0×candidates 0-32;
   G. 16×16 MB×candidates 3-4;
   H. 8×8 partition 1×candidates 0-32;
   I. 16×16 MB×candidates 5-6; J. 8×8 partition 2×candidates 0-32;
   K. 16×16 MB×candidates 7-8;
   L. 8×8 partition 3×candidates 0-32;
   M. Best 16×8 partitions as complete MB, Best 8×16 partitions as complete MB, Best 8×8 partitions as complete MB;
   and wherein the rule set for ordering the separately processable candidates comprises:
   B>A+1;
   D>C+1;
   F>E+1; G>F+1;
   H>G+1;
   J>1;
   K>J;
   L>K;
   M is last.

* * * * *

UNITED STATES PATENT AND TRADEMARK OFFICE
CERTIFICATE OF CORRECTION

| | | |
|---|---|---|
| PATENT NO. | : 8,687,708 B2 | Page 1 of 1 |
| APPLICATION NO. | : 13/140958 | |
| DATED | : April 1, 2014 | |
| INVENTOR(S) | : Dencher | |

It is certified that error appears in the above-identified patent and that said Letters Patent is hereby corrected as shown below:

On Title Page 2, in item (56), under "OTHER PUBLICATIONS", in Column 2, Line 7, delete "Serives," and insert -- Services, --, therefor.

In the Specification

In Column 3, Line 64, delete "Langrangian" and insert -- Lagrangian --, therefor.

In Column 6, Line 55, delete "Langrangian" and insert -- Lagrangian --, therefor.

In Column 12, Line 21, delete "Langrangian" and insert -- Lagrangian --, therefor.

In the Claims

In Column 13, Line 30, in Claim 1, delete "Langrangian" and insert -- Lagrangian --, therefor.

In Column 14, Line 63, in Claim 6, delete "claim 1" and insert -- claim 1, --, therefor.

In Column 15, Line 5, in Claim 7, delete "Apparatus" and insert -- An apparatus --, therefor.

In Column 15, Line 25, in Claim 11, delete "Langrangian" and insert -- Lagrangian --, therefor.

In Column 15, Line 42, in Claim 12, delete "coder" and insert -- decoder --, therefor.

In Column 15, Line 46, in Claim 13, delete "method" and insert -- video decoder --, therefor.

In Column 16, Line 10, in Claim 14, delete "method" and insert -- video decoder --, therefor.

In Column 16, Line 34, in Claim 15, delete "method" and insert -- video decoder --, therefor.

Signed and Sealed this
Twenty-first Day of July, 2015

Michelle K. Lee
*Director of the United States Patent and Trademark Office*